Aug. 17, 1948. J. S. BURDICK ET AL Re. 23,025

TYPEWRITER DESK FOR USE WITH DICTATING MACHINE TRANSCRIBING DEVICES

Original Filed March 10, 1939

INVENTORS.
John S. Burdick
and Carl S. Fairbank
BY Blair, Curtis & Hayward ATTORNEYS.

Reissued Aug. 17, 1948

Re. 23,025

UNITED STATES PATENT OFFICE 23,025

TYPEWRITER DESK FOR USE WITH DICTATING MACHINE TRANSCRIBING DEVICES

John S. Burdick, North Muskegon, Mich., and Carl S. Fairbank, Madison, N. J., assignors to The Shaw-Walker Company, Muskegon, Mich., a corporation of Michigan Original No. 2,220,475, dated November 5, 1940, Serial No. 260,946, March 10, 1939. Application for reissue May 6, 1948, Serial No. 25,424

1 Claim. (Cl. 45—90)

This invention relates to typewriter desks and especially to those designed for use with transcribing devices of dictating machines, and consists of the matters hereinafter described and more particularly pointed out in the appended claims.

Heretofore an independent stand or table has been provided for the support of the transcribing device of a dictating machine. Such stand is placed in the neighborhood of the typewriter desk at which the transcribing operator sits. It includes cords by which it is connected to the electric circuit by which it is operated; cords connecting the device to the ear pieces; and cords connected to the switches by which the operator starts, stops or reverses the feed of the cylinder on the transcriber. Obvious disadvantages are inherent in such a stand or support. It occupies floor space. It is in the road of the operator when moving to or from the desk. And the several cords are apt to be tripped over and disengaged from their sockets.

The object of the invention is to provide an improved typewriter desk with a unit comprising a base for the transcribing device of a dictating machine spaced back of and in convenient association with the typewriter platform, and having storage compartments for dictating machine recording cylinders located for ready access by the operator, with enclosed space for the cords which are thereby concealed from view and disposed out of the way so as not to interfere with the movements of the operator of the typewriter.

The advantages of the invention will appear more fully as we proceed with our specification.

Figure 1:
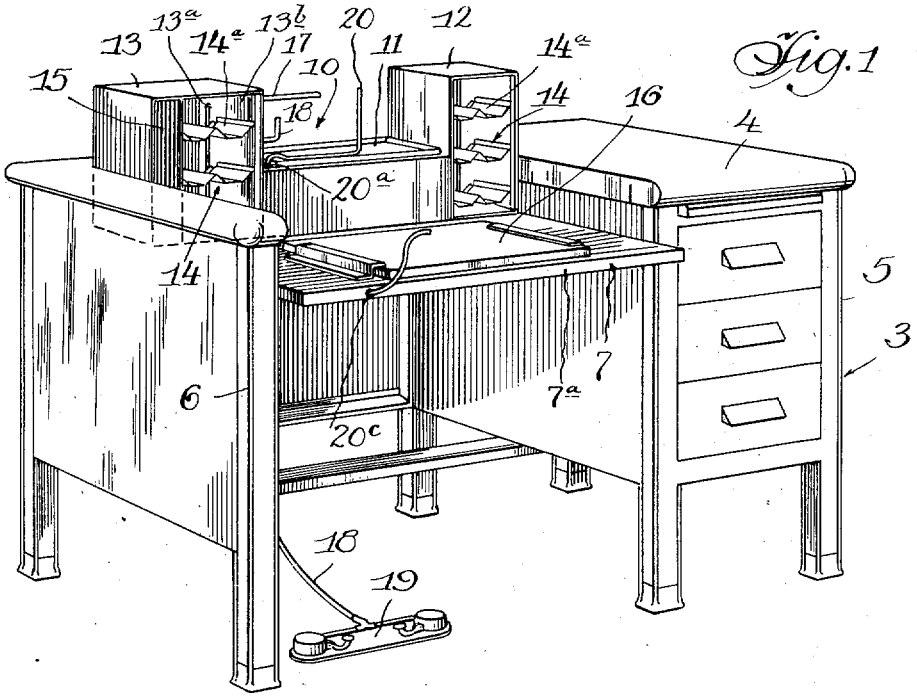
Figure 1 is a perspective view of the improved typewriter desk, with the novel unit for supporting the transcribing device.

Referring now to that embodiment of the invention illustrated in the drawing: 3 indicates the typewriter desk; 4, the top thereof; 5 and 6 indicate laterally spaced pedestals, and 7 indicates the typewriter platform supported below the desk top 4 and extending between and fixed to the pedestals 5 and 6 in the familiar manner. 10 indicates the unit for supporting the transcribing device. It consists of an elongated, low, rectangular hollow base 11 of length and breadth to receive the transcribing device and of upright open compartment members 12, 13 fixed to the ends of said base. The unit 10 as a whole is mounted on the typewriter platform at the rear of the same and occupies substantially the entire length of the space between the pedestals. The compartment member 12 has a plurality of shelves 14 placed in vertical spaced relation, and each shelf is formed to present parallel open top troughs **14*a*, there being, as shown, two such troughs on each shelf 14**. Said troughs are formed transversely to receive and support the recording cylinders which are to be inserted in the dictating machine transcribing device (not shown) in a well known manner.

The compartment 13 has like shelves 14 comprised of similar open troughs **14*a*. Preferably, and as illustrated, the compartment 13 has an open front vertically extending compartment 15** at one side of the cylinder compartment which may be used for envelopes and paper to be used by the operator of the typewriter.

The unit 10 is disposed on the typewriter platform back of the space 16 to be occupied by the typewriter and rises above the level of the desk top 4 as shown in Figure 1. It is not necessary to secure the unit 10 to the platform 7, said unit resting on and being retained in proper position by its own weight.

Figure 2:
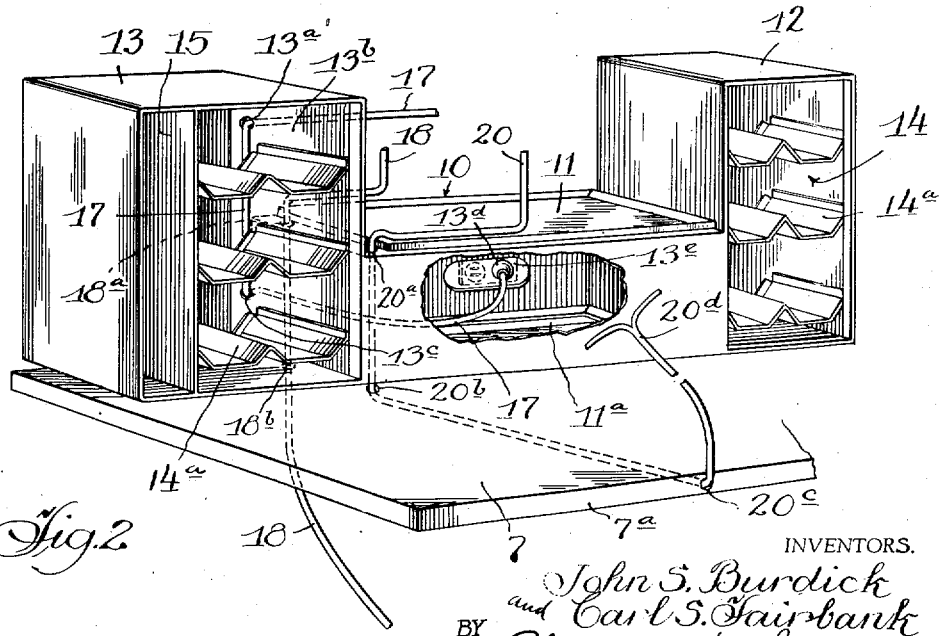
Figure 2 is a perspective view on an enlarged scale showing the unit for the support of the transcribing device mounted on the typewriter platform, with parts broken away to show the concealed electric cords and their connections.

The electric cords or cables are disposed as follows, as best shown in Figure 2: 17 indicates the power line cord which is to be connected to the transcribing device for operating it. Said cord, as shown, is led by a hole **13*a* through the side wall 13*b* of the compartment member 13, then along the inner face of said wall to a hole 13*c* whence it passes into the space enclosed within the hollow base 11. There it is provided with a plug 13*d* to be applied to a wall socket 13*e*. 18 indicates an electric cord or cable which connects the transcribing device to a foot control 19 adapted to be secured to the floor in convenient relation to the disposition of the feet of the operator of the typewriter. This cord or cable is carried down through a hole 18*a* into the interior of the hollow base, then down through a hole 18*b* in the typewriter platform 7. 20 indicates the cord or cable leading from the transcribing device to the ear pieces (not shown) to be used by the operator. Said cord, as shown, passes down through a hole 20*a* in the top of the hollow base 11, then through a hole 20*b* in the top wall of the typewriter platform 7, thence horizontally below said top wall through a hole 20*c* in the front flange 7*a* of said platform, thence above said platform, being connected at 20*d*** with the branches which are adapted to be connected to the ear pieces (not shown).

It will be noted by an examination of Figure 2 that the hollow base 11 is open at the bottom as indicated at 11*a*, and that ample space is provided therein above the platform 7 for the disposition of surplus lengths of the cords or cables when necessary. The wall socket 13*e* will be connected in the usual manner with the main power line (not shown).

By the foregoing construction and arrangement, the transcribing device may be mounted in easy reach of the operator of the typewriter for the insertion or removal of the recording cylinders, which when not in use are stored in the end compartments 12 and 13. And the cords and cables are enclosed in the main so that they are out of sight and out of the way of the operator.

We claim as our invention:

In combination with a typewriter desk having a typewriter platform, a unit for supporting a transcribing device on said desk in close association to said platform, said unit having a hollow base, cords including a power line cord, a foot control cord, and an ear piece cord adapted for connection to said transcribing device, said foot control cord descending through said hollow base and down below said platform, said ear piece cord descending through said hollow base and then transversely below said platform in close association therewith and extending beyond said platform, the inlet end of said power line cord being housed in said hollow base, and said hollow base and platform being provided with suitable openings for threading said several cords in the manner described whereby said cords are held from interference with the movement of the operator.

JOHN S. BURDICK.
CARL S. FAIRBANK.

REFERENCES CITED

The following references are of record in the file of this patent:

UNITED STATES PATENTS

| Number | Name | Date |
|---|---|---|
| 1,892,415 | Ulrich | Dec. 27, 1932 |